United States Patent [19]

Thornton et al.

[11] 4,081,899

[45] Apr. 4, 1978

[54] METHOD OF PRODUCING A SEALED ELECTROLYTE-LIMITED LEAD-ACID BATTERY

[75] Inventors: Roy F. Thornton; Joseph L. Weininger, both of Schenectady, N.Y.

[73] Assignee: General Electric Company, Schenectady, N.Y.

[21] Appl. No.: 757,469

[22] Filed: Jan. 7, 1977

[51] Int. Cl.² .......................................... H01M 2/36
[52] U.S. Cl. .................................. 29/623.2; 429/205
[58] Field of Search ........................... 29/623.1, 623.2; 429/205

[56] References Cited

U.S. PATENT DOCUMENTS

| | | | |
|---|---|---|---|
| 1,487,109 | 3/1924 | Lacy | 429/205 |
| 3,948,680 | 4/1976 | Mao et al. | 429/205 X |

Primary Examiner—Carl E. Hall
Attorney, Agent, or Firm—Paul R. Webb, II; Joseph T. Cohen; Jerome C. Squillaro

[57] ABSTRACT

A method of producing a sealed electrolyte-limited lead-acid battery is described which includes providing a container having a body portion and a cover with at least one opening therein, providing at least one positive plate, providing at least one negative plate, positioning a separator therebetween, positioning the plates with separator therebetween within the body portion of the container, affixing the cover to the body portion of the container, adding a limited amount of sulfuric acid electrolyte within the body portion containing a metallic sulfate in an amount equivalent to from 0.01 to 2.5 weight percent sodium sulfate, forming charged positive and negative plates therein, and sealing the battery.

3 Claims, No Drawings

METHOD OF PRODUCING A SEALED ELECTROLYTE-LIMITED LEAD-ACID BATTERY

The present invention relates generally to sealed lead-acid batteries, and more particularly, to such batteries which are electrolyte-limited or electrolyte starved.

The sealed lead-acid cell, which operates on the principle of oxygen recombination, requires that the amount of electrolyte in the cell is limited. Thus, a relatively small amount of sulfuric acid is added to the cell in manufacture during the "soaking" step, which step follows the mixing, pasting, and curing steps, but occurs before the formation step. It has been found that during the formation step, or more frequently, in cycling the cells, that some cells "short out" early. This is presumed to be caused by the solubilization of Pb(II) ions during the condition of high pH in the curing and soaking steps and the subsequent precipitation of $PbSO_4$ in the separator as well as on the plates at the low pH of cell operation. Thus, sealed lead-acid cells, formed with a limited amount of sulfuric acid electrolyte, have a tendency to short out by dendrite formation during the plate formation step or early in the cycle life of the cell.

Various prior art approaches have been taken to solve the above problem. Metal sulfates soluble in the electrolyte have been used in addition to the normal paste combination during the mixing of the paste. Such metal sulfates have been employed in the electrolyte of the completed battery. In U.S. Pat. No. 3,948,680, a method is described fashioning a lead-acid storage battery capable of being stored after completion of the battery processing and thereafter activated by the addition of an electrolyte. This method includes adding conditioning quantities of a treating or conditioning agent of an anhydrous metallic sulfate subsequent to or during the formation step of the battery plates. If the treating agent is employed after the formation step, it is retained in the battery which is otherwise substantially free of electrolyte and is sealed against an ingress of air until being activated by the addition of an electrolyte. In another embodiment of this patent, the conditioning agent is applied during the formation step, and the formation acid and subsequent rinsing water are drained out of the battery prior to its being sealed. The battery is subsequently activated by the addition of an electrolyte. Further treating agents can also be added prior to the sealing step.

The preparation of pasted lead plates is discussed in detail, for example, on pages 27–46 of "Storage Batteries" by George W. Vinal, published by J. Wiley & Sons, Inc., New York, N.Y., 1955.

The present invention prevents the above-discussed type of cell failure by the addition of 0.01 to 2.5 weight percent of metallic sulfate ions to the "soaking" step of the method thereby reducing the solubility of Pb(II) ions and preventing their subsequent appearance in the separator which causes short circuits during the formation step and on cycling. The present invention provides further the unique advantage of employing a single electrolyte and metallic sulfate ions during the sequential soaking and formation steps thereby eliminating separate soaking, formation and operating electrolyte baths.

None of the above-mentioned prior art references describes, suggests or teaches applicants' method of producing a sealed electrolyte-limited lead-acid battery.

The primary objects of our inventions are to provide an improved sealed electrolyte-limited lead-acid battery which has no dendrite formation during formation or charging, or during subsequent cycling.

In accordance with one aspect of our invention, a method of producing a sealed electrolyte-limited lead-acid battery includes providing a container having a body portion and a cover with at least one opening therein, providing at least one positive plate, providing at least one negative plate, positioning a separator therebetween, positioning the plates with separator therebetween within the body portion of the container, affixing the cover to the body portion of the container, adding a limited amount of sulfuric acid electrolyte within the body portion containing a metallic sulfate in an amount equivalent to form 0.01 to 2.5 weight percent of the sulfuric acid electrolyte, forming charged positive and negative plates therein, and sealing the battery.

These and various objects, features and advantages of the invention will be better understood from the following description.

We can produce a sealed electrolyte-limited or electrolyte-starved cell in a simplified manner which eliminates dendrite formation. We can prepare the positive and negative plates in a conventional manner in that we can mix the materials, paste the plates, and cure them as described in the above "Storage Battery" reference. We can paste plates of standard configuration or paste plates which are wound into a spiral form. The positive plate paste is prepared in a conventional manner by mixing together 454 grams of 25 percent red lead, 7.5 cc of 1.40 specific gravity sulfuric acid, $H_2SO_4$, and 56–60 cc of water. This material will paste in a conventional manner plates of conventional grid material having dimensions of 7.5 inches × 1.75 inches × 0.05 inch. The negative plate paste is prepared in a conventional manner by mixing together 454 grams of lead oxide containing approximately 25 percent lead, 33 cc of 1.40 specific gravity sulfuric acid, and 57–61 cc of water. This material will paste in a conventional manner 15 to 18 plates of conventional grid material having dimensions of 7.5 inches × 1.75 inches × 0.05 inch. The plates are cured in a conventional manner at an elevated temperature and with an initial high humidity. At least one positive plate and one negative plate with a porous separator therebetween are positioned in a suitable container having a body portion and a cover with at least one opening therein. The cover is affixed to the body portion of the container after which a limited amount of sulfuric acid electrolyte is added within the body portion containing a metallic sulfate, such as sodium sulfate, in an amount equivalent to from 0.01 to 2.5 weight percent sodium sulfate. The positive and negative plates are charged by forming in the conventional manner. The battery is sealed.

One elongated positive plate and one elongated negative plate with a porous separator therebetween can be wound into a spiral which is placed in the container.

A plurality of interleaved positive and negative plates can also be stacked within the container. Porous separators are positioned between the plates. The other steps as described above, are followed with these latter configurations.

In addition to sodium sulfate, various other metallic sulfates soluble in the battery electrolyte can be employed. For example, these include metallic sulfates of potassium, lithium, magnesium, cadmium, zinc and aluminum. From the economic standpoint, sodium sulfate and also zinc sulfate are preferred. Additionally, sodium hydroxide or acid sulfates can be added to the sulfuric acid electrolyte to form the metallic sulfate.

Our method results in a sealed electrolyte-limited lead-acid battery with charged plates and no dendrite formation. A single sulfuric acid electrolyte and a metallic sulfate soluble therein are employed in the soaking and formation steps as well as in the operation of the battery. Separate electrolytes are avoided for the soaking and formation steps. An additional electrolyte is not required for battery operation. However, minor adjustments to the amount of electrolyte can be made after formation. While the above discussed U.S. Pat. No. 3,948,680 employs a metallic sulfate treating step, the methods described therein employ a plurality of electrolytes and one or more treating rinses. The end product is an unsealed but temporarily closed battery with residual electrolyte only. Subsequently, additional electrolyte is added to activate the battery.

A one-step formation without addition, reduction or substitution of electrolyte solution is employed in the method of our invention. The paste for the plates involves only a relatively small amount of acid and sulfate ions, which is insufficient either to prevent an alkaline condition in the paste or to allow the formation of the insoluble $PbSO_4$ to form. Instead, the basic lead sulfates are formed, $xPbO.PbSO_4$, where $x = 1, 3,$ or $4$, depending on the temperature and other conditions of pasting.

In our method, in the following "soaking" step, there is added a sufficient amount of $H_2O$ and $H_2SO_4$ to allow for subsequent formation and cycling of the battery. It is desired to add sufficient acid so that after formation the final acid strength, on cycling, should vary between approximately 1.30 s.g. $H_2SO_4$ at full charge and 1.10 s.g. $H_2SO_4$ at the end of discharge. Specifically, for a 2.25 amp.-hr. cell with 30 g. of positive paste and 24.5 g. of negative paste, taking into account the smaller amount of acid used during mixing, the acid to be added in "soaking" should be 14.1 cc of 1.40 s.g. acid $H_2SO_4$. This comprises 9.98 g. $H_2SO_4$ and 9.81 g. $H_2O$ giving a 50.4 weight percent solution of $H_2SO_4$ in 14.1 cc of 1.40 s.g. acid. According to the present invention, this solution should also contain 0.01 to 2.5 weight percent metallic sulfate with respect to the electrolyte solution.

An example is set forth of a sealed electrolyte-limited lead-acid battery in accordance with the method of our invention:

EXAMPLE I

A sealed electrolyte-limited lead-acid battery for 2.25 amp-hour operation is formed by providing a container having a plastic body portion and a metal cover with at least one opening therein. A positive plate with 30 grams of positive paste and a negative plate with 24.5 grams of negative paste have a separator positioned therebetween. The plates with the separator therebetween are wound into a spiral and positioned within the body portion of the container. The cover is affixed to the body portion of the container. 14.1 cubic centimeters of 1.40 specific gravity sulfuric acid electrolyte is added within the body portion containing a metallic sulfate of sodium sulfate in an amount of 0.01 gram. The positive and negative plates are charged conventionally within the container. The container is sealed to provide a sealed electrolyte-limited lead-acid battery.

While other modifications of the invention and variations thereof which may be employed within the scope of the invention have not been described, the invention is intended to include such as may be embraced within the following claims.

What we claim as new and desire to secure by Letters Patent of the United States is:

1. A method of producing a sealed electrolyte-limited lead-acid battery which comprises providing a container having a body portion and a cover with at least one opening therein, providing at least one positive plate, providing at least one negative plate, positioning a separator therebetween, positioning the plates with separator therebetween within the body portion of the container, affixing the cover to the body portion of the container, adding a limited amount of sulfuric acid electrolyte within the body portion containing a metallic sulfate in an amount equivalent to from 0.01 to 2.5 weight percent sodium sulfate, forming charged positive and negative plates therein, retaining within the body portion the limited amount of sulfuric acid electrolyte containing the metallic sulfate, and sealing the battery.

2. A method of producing a sealed electrolyte-limited lead-acid battery as in claim 1, in which there are provided a plurality of interleaved positive plates and negative plates.

3. A method of producing a sealed electrolyte-limited lead-acid battery as in claim 1, in which the plates with the separator therebetween are wound into a spiral, and the spiral is positioned within the body portion of the container.

* * * * *